Oct. 9, 1934.  M. H. S. AFFLECK ET AL  1,976,533

CLAMPING DEVICE FOR ROPES, CABLES, OR THE LIKE

Filed Nov. 15, 1933

Patented Oct. 9, 1934

1,976,533

UNITED STATES PATENT OFFICE 1,976,533

CLAMPING DEVICE FOR ROPES, CABLES, OR THE LIKE

Myron H. S. Affleck, Providence, R. I., and Joseph M. Duffy, Brookline, Mass.

Application November 15, 1933, Serial No. 698,138

4 Claims. (Cl. 24—135)

This invention relates to improvements in clamping devices for connecting the looped ends of ropes, cables or the like and for similar purposes.

One object of the invention is to provide a clamping device of maximum strength and efficiency capable of withstanding as great stress and strain as the rope or cable to which it is applied.

Another object of the invention is to provide a clamping device of the type indicated which is composed of two members of the same form and construction whereby to render the device economical to manufacture and convenient to apply.

Another object of the invention is to provide a device of the type indicated comprising opposite clamping members provided with spirally fluted or corrugated rope-receiving grooves with projections extending at right-angles to the grooves in overlying relation thereto to hold the ropes in place therein.

Another object of the invention is to provide a device of the type indicated in which each of the two cooperating members is formed with an integral stud receivable in a suitable aperture in the opposite member; the studs being shaped to cooperate with opposite projections on the members whereby to form a substantially continuous, unbroken wall for holding the ropes or cables in place in the grooves of the clamping members.

Another object of the invention is to provide a device of the type indicated designed to avoid any crevices in the opposite clamping members liable to pinch and cut the strands of the rope to impair its strength.

Another object of the invention is to provide a device of the type indicated which is sturdy in construction and durable in use over long periods.

Further objects of the invention are set forth in the following specification which describes a preferred embodiment of the invention, by way of example, as illustrated by the accompanying drawing. In the drawing.

The present improved rope-clamp comprises, in general, a pair of cooperating members of the same construction having complementary grooves for receiving the ropes or cables. A stud formed integral with each member is inserted through an opening in the opposite member to receive nuts screwed onto their projecting ends whereby to draw the members together to bind against the ropes extending therebetween. As a feature of improvement in the present invention means are provided for preventing lateral displacement of the rope lengths with respect to the holding grooves. Specifically, such means may consist in providing the stud of each member with a flat portion which cooperates with opposed lateral projections on the opposite member to form substantially unbroken walls reaching across between the grooves.

Figure 1:
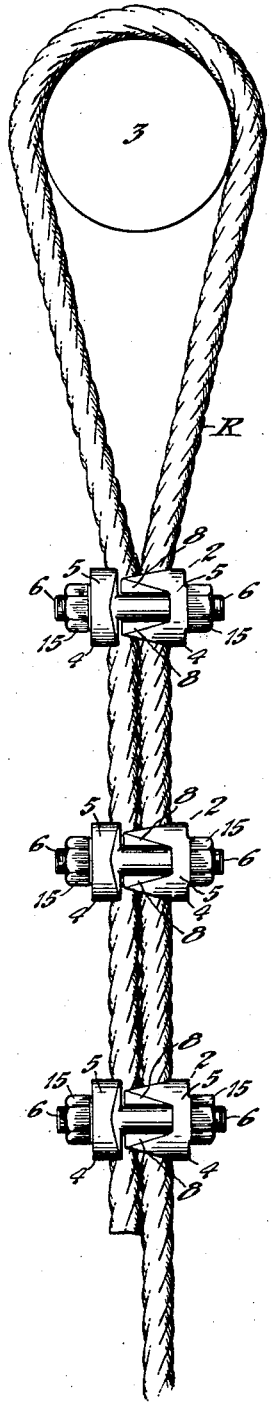
Fig. 1 is a view of a guy-rope shown as looped around an anchoring post or the like with its end secured to the main length by means of the present improved clamping devices.
Figure 2:
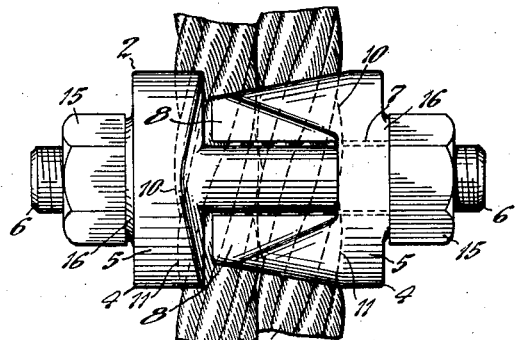
Fig. 2 is an enlarged plan view of the clamping device showing two lengths of rope clamped together thereby.

Referring first to Fig. 1 of the drawing, the improved clamping device 2 is herein illustrated as applied to use on a guy-rope R for staying structural frames, trusses, posts, masts and the like. When used in this manner the wire rope is looped around a suitable post or anchor-pin 3 with the end of the rope secured to its main length by means of clamping devices 2. Besides its use for securing the ends of looped ropes the device is well adapted for joining two lengths of a rope or cable.

Figure 3:
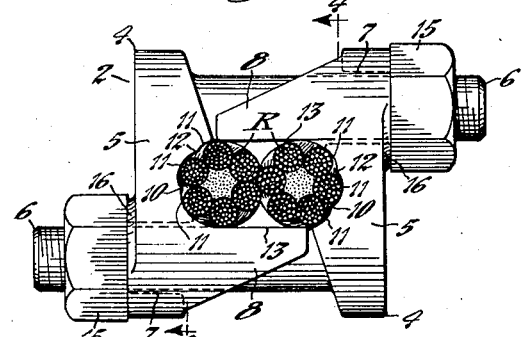
Fig. 3 is an end view of the clamp showing the two lengths of rope in cross-section.
Figures 4, 5:
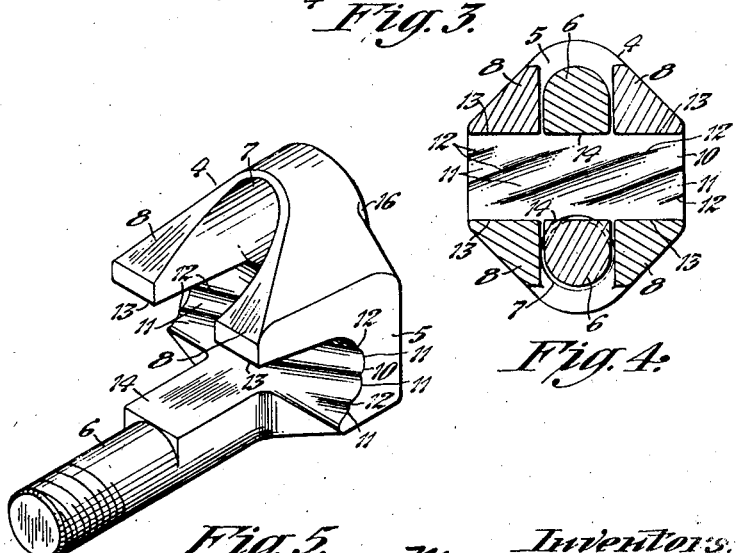
Fig. 4 is a transverse sectional view of the clamp on line 4—4 of Fig. 3 illustrating the formation of the rope-engaging groove.
Fig. 5 is a perspective view of one of the clamping members.

Referring to Fig. 5 of the drawing each member 4 of the clamp 2 comprises a body portion 5 formed with an integral stud 6 projecting laterally at one end and screw-threaded at its extremity. At the other end of the member 4 is a transverse hole 7 for receiving the stud 6 of the opposite member 4 when the two parts are assembled as shown in Fig. 3. Reaching outwardly from the side of the member 4 on opposite sides of the hole 7 are lateral projections or tapering lugs 8 which extend in opposite parallel relation to the side of the stud 6.

Between the arms 8 and the stud 6 the body portion 5 of the member 4 is hollowed out in an arcuate groove or concavity 10 which is spirally fluted or corrugated at 11 to form depressions or channels for receiving the individual helical strands of the rope. The sharp projections 12 between the corrugations are adapted to enter between the strands of the rope to prevent the latter from twisting or turning in the clamping device.

The projections or lugs 8 are formed with flat sides 13 and the opposite facing side of the stud 6 is shaped to provide a corresponding flat face 14. Referring to Fig. 4, when the opposite clamping members 4 are assembled in cooperative relationship the flat sides 13 of the lugs 8 and the flat faces 14 of the studs 6 are brought into alinement to form substantially continuous, unbroken walls bridging the space between the grooves 10 to prevent lateral displacement of the ropes R with respect to the grooves. Through this provision all openings or crevices into which the strands of rope might be forced are avoided, thereby removing the danger of the strands becoming cut or otherwise damaged to impair the strength of the rope.

To draw the opposite clamping members 4 together to bind them against the lengths of rope R in the grooves 10, nuts 15 are screwed onto the projecting threaded ends of the studs 6 and tightened against bosses 16 surrounding the holes 7. The improved clamping device is applied to use in the manner as next explained.

To apply the clamping device 2 to the overlying lengths of a rope the two members 4 are positioned at opposite sides thereof with the rope lengths seated in the grooves 10. The stud 6 on each member 4 is passed through the hole 7 of the opposite member and a nut 15 screwed onto its projecting end. The nuts 15 are set up against the bosses 16 through the use of a suitable wrench to draw the members 4 together. As the members are drawn together the lengths of the looped rope R are forced snugly into the grooves 10 and bound tightly, one against the other. As the clamping members 4 are drawn together the flat sides 13 of the lugs 8 and the flat faces 14 of the studs 6 act to guide the rope into position in the grooves 10.

With the lengths of rope R clamped together in the manner as above explained they are enclosed on all sides, the grooves 10 engaging around approximately one-half the circumference of each rope and the studs 6 and lugs 8 cooperating in dovetailed relationship to bridge the space between the grooves, on opposite sides of the ropes. Through this arrangement the two lengths of rope are entirely enclosed and bound on four sides to prevent them from working out of the grooves 10. The spirally fluted grooves 10 are formed to closely follow the contour of the rope to provide a snug fit and prevent its twisting or turning in the clamp.

It will be observed from the foregoing that the present invention provides an extremely simple and efficient clamping device for the purposes specified. The device comprises only two members of identical form and construction so as to provide for economical methods of manufacture. The two members are most conveniently applied to use and when fastened in place the ends of the rope or cable are securely bound together to withstand maximum pulling and twisting strains. With the use of the present improved device no undue strain is exerted upon the rope to which it is applied since it is not necessary to compress the rope to any great extent.

The two clamping members being complementary and interchangeable may be applied to either side of the looped rope with equal efficiency. The necessity for determining the correct member to be used at either side of the loop is thereby avoided and the device may be more expeditiously applied.

Due to the fact that the cooperating members are constructed of relatively great width the tendency to bend or otherwise deform the rope is entirely eliminated. This feature of the invention constitutes an improvement over previously used devices of a similar type employing relatively narrow members in the form of U-bolts liable to cut into or bend the rope to impair its strength.

The spirally fluted grooves in the two cooperating clamping members serve to prevent relative sliding movement of the rope therein and the cooperating flat-sided studs and projecting lugs guard against lateral displacement or disengagement of the rope from the grooves. The present invention thus provides a clamping device which is proof against derangement and durable in use over long periods.

While the present clamping device is shown and described as applied to ropes, it is to be understood that the clamp is adaptable for use with wires, cables, rods and the like. It is also to be understood that whereas the device is herein shown and described as embodied in a preferred form of construction, various modifications may be made in the structure and arrangement of its parts without departing from the spirit or scope of the invention. Therefore, without limiting ourselves in this respect, we claim:

1. In a rope-clamp, the combination of a pair of clamping members, each member comprising a body portion formed with a rope-receiving groove, a stud formed integral with each member to project through a hole in the opposite member, means for drawing the members together, and interfitting parts on the two members adapted to straddle the sides of the rope for a considerable distance therealong to prevent it from bending or twisting in the grooves as the members are clamped together.

2. In a rope-clamp, the combination of opposite clamping members having corrugated grooves in their sides for receiving the strands of a rope, a stud formed integral with each member and a hole in each member for receiving the stud on the opposite member, said studs being provided with flat faces on their sides, and lugs on each member projecting at the sides of the hole and adapted to straddle the sides of the stud on the opposite member to form substantially unbroken walls extending a considerable distance along the length of the rope to hold the latter from bending or twisting in the grooves.

3. In a rope-clamp, the combination of two members of identical form and construction each comprising a clamping portion provided with a groove, said grooves being spirally corrugated to receive the strands of the rope, a stud formed integral with each member and a hole in each member for receiving the stud on the opposite member, nuts on the projecting ends of the studs for drawing the members together to clamp the ropes therebetween, and lugs straddling the sides of the studs to provide unbroken walls extending a considerable distance along the ropes to prevent lateral displacement of the ropes with respect to the grooves.

4. In a rope-clamp, the combination of two cooperating members, each comprising a body portion provided with a groove, a stud formed integral with the body portion of each member and projecting from one side of the groove, an aperture in the body portion for receiving the stud on the opposite member, means for drawing the clamping members together to bind lengths of rope therebetween, and lugs projecting laterally from each member at the sides of its aperture and arranged to overlie the sides of the stud on the opposite member, said lugs and studs providing substantially unbroken walls extending a considerable distance longitudinally of the rope to overcome the tendency of the rope to bend as it is held in the grooves.

MYRON H. S. AFFLECK.
JOSEPH M. DUFFY.